United States Patent

Washington

[11] Patent Number: 5,263,276
[45] Date of Patent: Nov. 23, 1993

[54] FISHING ROD ATTACHMENT

[76] Inventor: Fred Washington, P.O. Box 82114, Oklahoma City, Okla. 73148

[21] Appl. No.: 948,224

[22] Filed: Sep. 21, 1992

[51] Int. Cl.⁵ .............................................. H01K 87/00
[52] U.S. Cl. ........................................ 43/25.2; 43/57.1
[58] Field of Search ........................... 43/57.1, 25, 25.2

[56] References Cited

U.S. PATENT DOCUMENTS

| | | | |
|---|---|---|---|
| 786,352 | 4/1905 | Frost | 43/57.1 |
| 1,601,945 | 10/1926 | Davis . | |
| 2,179,578 | 11/1939 | Monighan | 43/33 |
| 2,514,645 | 7/1950 | Jardine | 43/25.2 |
| 2,691,840 | 10/1954 | Smith | 43/25.2 |
| 2,715,292 | 8/1955 | Williams | 43/25.2 |
| 2,763,083 | 9/1956 | Lenz | 43/25.2 |
| 2,825,992 | 3/1958 | Miller | 43/25.2 |
| 2,841,917 | 7/1958 | Haskell | 43/57.1 |
| 2,878,610 | 3/1959 | Herstedt | 43/25.2 |
| 2,943,414 | 7/1960 | Tussing | 43/25.2 |
| 2,984,931 | 5/1961 | Shaw | 43/57.1 |
| 2,993,293 | 7/1961 | Blout | 43/25.2 |
| 3,164,334 | 1/1965 | Gris | 242/84.1 |
| 3,295,245 | 1/1967 | Mulliken | 43/57.1 |
| 3,418,742 | 12/1968 | Yaklyvich | 43/25.2 |
| 3,545,119 | 12/1970 | Murnan | 43/25.2 |
| 4,457,095 | 7/1984 | Stevenson | 43/25.2 |
| 4,648,197 | 3/1987 | Weiberg, Jr. | 43/25 |

Primary Examiner—Kurt C. Rowan
Attorney, Agent, or Firm—William S. Dorman

[57] ABSTRACT

A fishing rod attachment with a tapered aperture defined by longitudinal ribs for securing the free end of fishing line when the fishing rod is not in use.

4 Claims, 1 Drawing Sheet

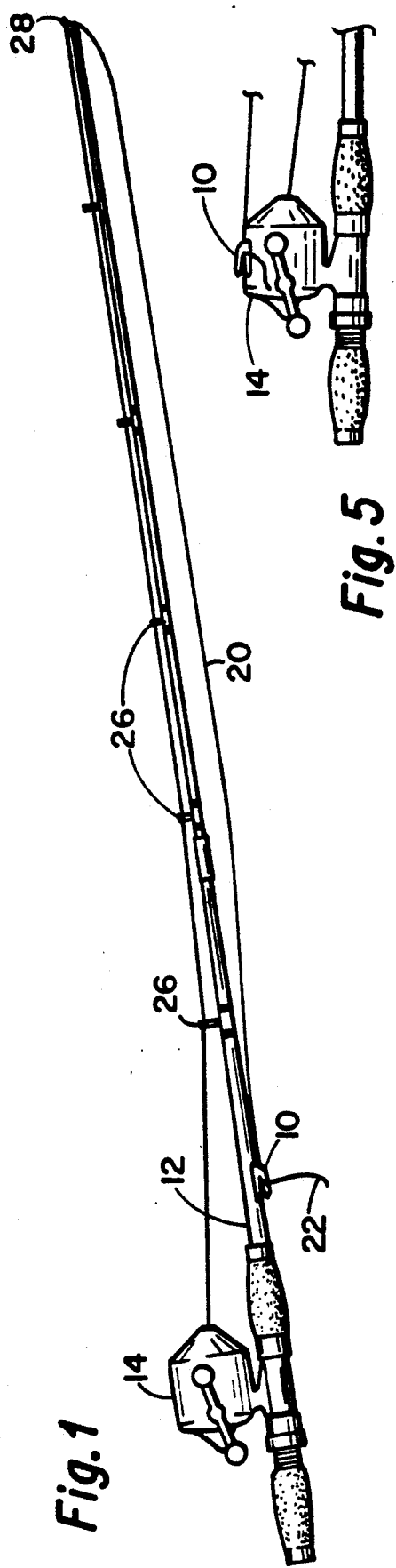
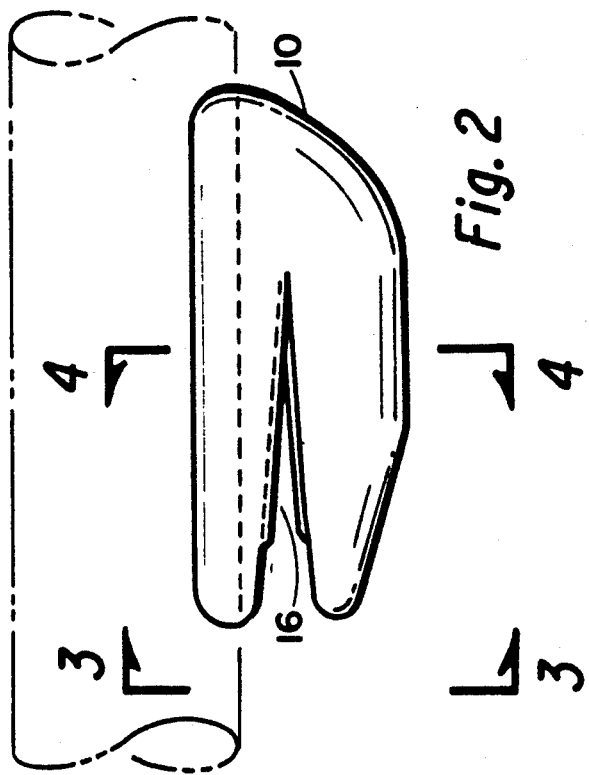
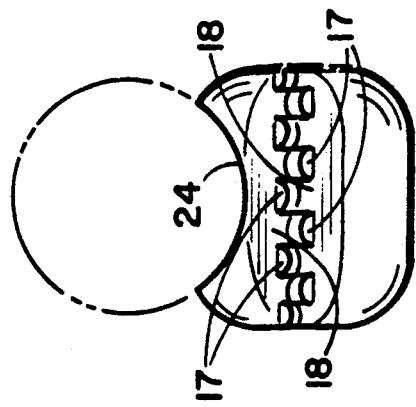
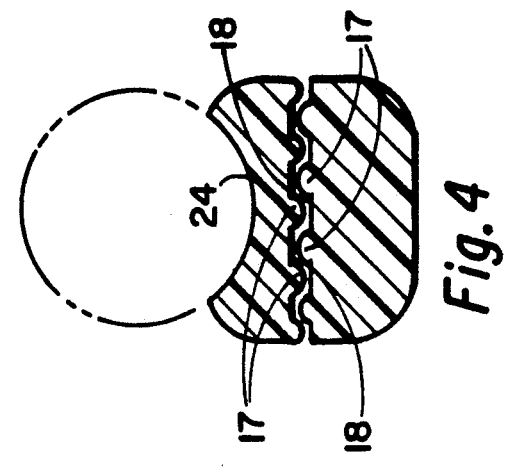

FISHING ROD ATTACHMENT

BACKGROUND OF THE INVENTION

1. Field of the Invention

The present invention relates to a fishing rod attachment. More particularly, the present invention relates to such an attachment for securing a loose end of fishing line in place to prevent the unthreading of these loose ends through the eye guides on the fishing rod.

2. The Prior Art

Most fishermen have two or more fishing rods (or poles) which they use alternatively, or maybe at the same time. When the fishing rods are in use, the fishing lines have hooks, plugs, or lures attached to the free ends thereof. When the fishing rods are not in use, assembling the rods with hooks or lures together for storage or transportation is not convenient, as the hooks or lures catch onto each other, or onto fishing line, and everything gets all tangled together. Accordingly, fishermen customarily cut the hooks or lures off the ends of fishing lines before assembling fishing rods together. However, once a hook or lure is removed from the end of a fishing line, the line has a tendency to unthread through the eye guides on the rod, causing a fisherman to have to re-thread the fishing line back through the eye guides before attaching a hook, lure, or plug for use.

An object of the present invention is to provide a fishing rod attachment for preventing the loose end of a fishing line from unthreading through the eye guides on a fishing rod. Another object of the present invention is to provide such a fishing rod attachment which is attachable to all types and sizes of rod and reel combinations. Further objects and advantages of the present invention will be made apparent by the following specification and claims.

A preliminary search was conducted on the present invention and the following represent the results of the search:

| U.S. PAT. NO. | PATENTEE | DATE |
| --- | --- | --- |
| 1,601,945 | Davis | Oct. 5, 1926 |
| 2,179,578 | Monigham | Nov. 14, 1939 |
| 2,514,645 | Jardine | July 11, 1950 |
| 2,715,292 | Williams | Aug. 16, 1955 |
| 2,763,083 | Lenz | Sept. 18, 1956 |
| 2,825,992 | Miller | Mar. 11, 1958 |
| 2,878,610 | Herstedt | Mar. 24, 1959 |
| 3,164,334 | Gris | Jan. 5, 1965 |
| 3,418,742 | Yaklyvich | Dec. 31, 1968 |
| 3,545,119 | Murnan | Dec. 8, 1970 |
| 4,457,095 | Stevenson | July 3, 1984 |
| 4,648,197 | Weilberg, Jr. | Mar. 10, 1987 |

U.S. Pat. No. 1,601,945 describes a fish hook protector which is adapted to prevent the hook from becoming entangled during transportation of a fishing pole from one location to another. The protector is a flexible member with a depression therein having a longitudinally extending rib with a plurality of openings adapted to accommodate the bill of a hook. The protector further has a movably connected cover.

U.S Pat. No. 2,179,578 describes a fishing pole appliance, which has a plurality of protrusions disposed in different directions, adapted to retain fishing line and hooks.

U.S. Pat. No. 2,514,645 describes a hook retaining means which comprises an aperture disposed collinearly with the fishing line on a fishing rod.

U.S. Pat. No. 2,715,292 describes a fish hook guard device which has a jaw member adapted to receive a fish hook.

U S. Pat. No. 2,763,083 describes a device which attaches to a fishing pole and provides both a guard for receiving a hook and a line retaining coil for holding fishing line taut. The line retaining coil has apertures disposed collinearly with fishing line on the rod.

U.S. Pat. No. 2,825,992 describes a clamp adapted for fastening upon a fishing pole for receiving the fish hook carried by the fishing line on the pole.

U.S. Pat. No. 2,878,610 describes a fishing pole attachment with a flexible ball which is squeezed open for storage of sinkers, hooks, and other appurtenant fishing articles.

U.S. Pat. No. 3,164,334 describes a spinning reel line retainer adapted for support by a spinning reel shank and adapted to releasably and clampingly engage the free end of fishing line carried by the spinning reel.

U.S. Pat. No. 3,418,742 describes a fishing rod handle construction which includes a storage space for hooks.

U.S Pat. No. 3,545,119 describes a fishing pole attachment for preventing twisting of fishing line, which attachment has an aperture disposed collinearly with the fishing line.

U S. Pat. No. 4,457,095 describes a fishing line holder which has an aperture, disposed collinearly with the fishing line on a rod, for supporting the free end of the fishing line when transporting fishing gear.

U.S. Pat. No. 4,648,197 describes a fishing line handler which secures onto a fishing rod and has wound wire segments for retaining fishing line during lure replacement.

To the best of my knowledge, none of the above-described fishing rod attachments are commercially available. Further, none of the above-mentioned U.S. Patents describe a fishing rod attachment having the construction, design, or effectiveness of the fishing rod attachment of the present invention.

SUMMARY OF THE INVENTION

The objects of the present invention can be attained by a fishing rod attachment comprising a wedge having a tapered aperture defined by longitudinal ribs, wherein the tapered aperture is disposed at a right angle to fishing line on a fishing rod when the wedge is attached to the rod.

BRIEF DESCRIPTION OF THE DRAWINGS

FIG. 1 is a side view of a fishing rod and reel with the fishing rod attachment of the present invention secured thereto.

FIG. 2 is a side view, on an enlarged scale, of an embodiment of the fishing rod attachment of the present invention with a portion of the fishing rod shown in dotted lines.

FIG. 3 is a front view of the fishing rod attachment shown in FIG. 2, looking along line 3—3; and FIG. 4 is a sectional cut taken along sectional line 4—4 of FIG. 2.

DETAILED DESCRIPTION OF THE PREFERRED EMBODIMENT

FIG. 5 is a side view of a portion of a rod and reel showing the wedge attached directly to the reel.

Referring now to the figures, the fishing rod attachment of the present invention comprises a block or wedge 10 adapted to attach to the fishing rod or pole 12 just forward of the reel 14. The wedge 10 is provided with a tapered aperture 16 which is further defined by a plurality of longitudinal ribs 17 formed by a plurality of longitudinal serrations or grooves 18. After the plug or lure (not shown) is cut from line 20, the free end 22 of the line 20 is inserted into the tapered aperture 16 of the wedge 10. A slight tug on the free end 22 of the line 20 provides a firm attachment of the line to the wedge 10.

In somewhat greater detail, the wedge 10 is adapted to attach to any fishing pole 12, whether used with a conventional reel, a spinning reel, a closed-face reel, or a fly fishing reel. As illustrated in the embodiment of FIGS. 3 and 4, the top edge 24 of the wedge 10 is slightly curved so that the top edge 24 will fit snugly against a fishing pole 12, and thus facilitate attachment of the wedge 10 to the fishing pole 12. Referring to FIG. 1, the wedge 10 is secured to a fishing pole 12, just forward of the reel 14 so that the longitudinal axes of the wedge 10 and the fishing pole 12 are substantially parallel. The tapered aperture 16 is thus disposed substantially at a right angle to fishing line 20. The wedge 10 can be attached to the fishing pole 12 at any convenient location. Desirably, the wedge 10 is located on a side of the fishing pole 12 opposite the eye guides 26 (as shown). In the embodiment illustrated by FIG. 1, the wedge 10 is attached to the fishing pole 12 with an adhesive substance such as glue or cement. In another embodiment of the invention (not illustrated), the top edge 24 of the wedge 10 is substantially flat to facilitate attachment of the wedge 10 to the reel 14.

Referring now to FIG. 2, the wedge 10 of the present invention is provided with a tapered aperture 16 for receiving the free end 22 of fishing line 20. The function of the tapered aperture 16 is to hold the free end 22 of fishing line 20 in place. In one embodiment, the opening of the tapered aperture 16 measures about 0.50 thousandths of an inch at a widest portion thereof down to about 0.04 thousandths of an inch at a narrowest portion thereof. The afore-mentioned tapered aperture 16 is suitable for securing fishing line used for sport fishing ranging from two pound test line to 150 pound test line. This embodiment is provided as an example, and is not intended to be limiting. As illustrated in FIGS. 3 and 4, the tapered aperture 16 is further defined by a plurality of longitudinal ribs 17 formed by a plurality of longitudinal serrations or grooves 18. The upper ribs 17 are disposed substantially opposite the lower grooves 18, and the lower ribs 17 are disposed substantially opposite the upper grooves 18. The rib 17/groove 18 arrangement provides added holding power for securing the free end 22 of fishing line 20 within the tapered aperture 16.

The utility and advantages of the fishing rod attachment of the present invention are illustrated by the following example. The free end 22 of the fishing line 20 has a plug attached thereto for fishing. A wedge 10 of this invention is glued to a fishing pole 12 just forward of the reel 14. The small size of the wedge 10, relative to the size of the fishing pole 12, and location of the wedge 10 on the fishing pole 12 are advantageous in that the wedge 10 causes substantially no interference with the normal operation of the fishing rod. Once the fishing rod has been used for fishing, the fisherman cuts the plug from the free end 22 of fishing line 20 and inserts the free end 22 of fishing line 20 into the tapered aperture 16 of the wedge 10 to prevent the fishing line 20 from working its way back through the eye guides 26 on the fishing rod. A slight tug on the free end 22 of the fishing line 20, in the direction of the end 28 of the fishing rod, positions the fishing line 20 in the portion of the aperture 16 where upper ribs 17 and lower grooves 18 are spaced closely enough together to secure the line 20 in place, and thus, provides a firm attachment of the fishing line 20 to the wedge 10. The fisherman can then place the fishing rod next to him and pick up another rod to use for fishing, without concern that hooks on the line he is finished with will catch on his skin, clothing, or other equipment. Further, he can store the rod along with other rods without having the plug get entangled in the lines of the other rods.

While the foregoing describes specific preferred embodiments of the present invention, it is to be understood that various modifications and refinements which depart from the described embodiments of the present invention may be adopted without departing from the spirit and scope of the present invention.

What is claimed is:

1. A fishing rod attachment for securing a loose end of a fishing line to prevent the same from unthreading through the eye guides on a fishing rod comprising a wedge have a tapered aperture defined by longitudinal ribs, said aperture being substantially at right angles to a fishing line on a fishing rod when the wedge is attached to the rod, the wedge having a slightly curved top edge to facilitate attachment of the wedge to the fishing rod, the longitudinal ribs in the aperture including upper longitudinal ribs formed by upper longitudinal grooves and disposed substantially opposite lower longitudinal grooves, and lower longitudinal ribs formed by the lower longitudinal grooves being disposed substantially opposite the upper longitudinal grooves.

2. A fishing rod attachment as described in claim 1 wherein the tapered aperture measures about 0.50 thousandths of an inch at a widest portion thereof down to about 0.04 thousandths of an inch at a narrowest portion thereof.

3. A method for securing the loose end of a fishing line on a fishing rod to prevent unthreading of the line through eye guides on the rod comprising mounting a wedge having a tapered aperture on the rod such that the tapered aperture is disposed substantially at right angles to the fishing line on the fishing rod, the tapered aperture being further defined by longitudinal ribs; the longitudinal ribs in the aperture including upper longitudinal ribs formed by upper longitudinal grooves and disposed substantially opposite lower longitudinal grooves, and lower longitudinal ribs formed by the lower longitudinal grooves being disposed substantially opposite the upper longitudinal grooves, and securing a free end of the fishing line within the tapered aperture.

4. A method as described in claim 3 wherein the wedge is attached to a reel.

* * * * *